United States Patent
De Francesco et al.

(10) Patent No.: US 11,945,472 B2
(45) Date of Patent: Apr. 2, 2024

(54) TRAJECTORY PLANNING OF VEHICLES USING ROUTE INFORMATION

(71) Applicant: Motional AD LLC, Boston, MA (US)

(72) Inventors: Daniele De Francesco, Lexington, MA (US); Aravindkumar Vijayalingam, Singapore (SG)

(73) Assignee: Motional AD LLC, Boston, MA (US)

( * ) Notice: Subject to any disclaimer, the term of this patent is extended or adjusted under 35 U.S.C. 154(b) by 381 days.

(21) Appl. No.: 17/006,763

(22) Filed: Aug. 28, 2020

(65) Prior Publication Data

US 2022/0063674 A1    Mar. 3, 2022

(51) Int. Cl.
*B60W 60/00* (2020.01)
*G06N 20/00* (2019.01)
*H04W 4/44* (2018.01)
*H04W 4/46* (2018.01)

(52) U.S. Cl.
CPC ......... *B60W 60/0027* (2020.02); *G06N 20/00* (2019.01); *H04W 4/44* (2018.02); *H04W 4/46* (2018.02); *B60W 2554/4041* (2020.02); *B60W 2554/4042* (2020.02); *B60W 2554/4044* (2020.02); *B60W 2556/65* (2020.02)

(58) Field of Classification Search
CPC ......... B60W 2556/65; B60W 60/0027; B60W 2554/4041; B60W 2554/4042; B60W 2554/4044; B60W 30/10; B60W 50/0097; H04W 4/44; H04W 4/46; G08G 1/096844; G08G 1/127; G08G 1/096827; G06N 20/00; G05D 1/0227; G05D 1/0212; G05D 1/0088; G01C 21/3461; G01C 21/28; G01C 21/3415; G01C 21/3492

See application file for complete search history.

(56) References Cited

U.S. PATENT DOCUMENTS

| | | | |
|---|---|---|---|
| 10,671,076 B1 | 6/2020 | Kobilarov et al. | |
| 10,710,592 B2 * | 7/2020 | Lin | G05D 1/0221 |
| 10,809,077 B2 * | 10/2020 | Gordon | G01C 21/20 |

(Continued)

FOREIGN PATENT DOCUMENTS

| | | |
|---|---|---|
| EP | 3467799 | 4/2019 |
| JP | 6272566 | 1/2018 |

(Continued)

*Primary Examiner* — Geepy Pe
*Assistant Examiner* — Kimia Kohankhaki
(74) *Attorney, Agent, or Firm* — Fish & Richardson P.C.

(57) ABSTRACT

Among other things, techniques are described for improving the trajectory estimates for an object in an environment. The technique includes receiving, by at least one processor, information indicating a presence of an object operating in an environment; determining, by the at least one processor, a trajectory of the object, the trajectory including at least a position, a speed, and a direction of travel of the object; determining, by the at least one processor, an expected route of the object, wherein the expected route is pre-planned and includes an expected future position of the object at a future time; comparing the trajectory of the object to the expected route of the object; and in accordance with the comparison that the trajectory of the object is consistent with the expected route of the object, updating the trajectory of the object based on the expected route of the object.

20 Claims, 9 Drawing Sheets

(56) References Cited

U.S. PATENT DOCUMENTS

| | | | |
|---|---|---|---|
| 10,889,295 B2 * | 1/2021 | Paris | B60W 50/0097 |
| 2018/0052005 A1 * | 2/2018 | Schilling | G01S 5/0072 |
| 2018/0182245 A1 | 6/2018 | Takabayashi et al. | |
| 2018/0247537 A1 * | 8/2018 | Oh | G01C 21/3658 |
| 2018/0326982 A1 * | 11/2018 | Paris | B60W 30/18154 |
| 2018/0374341 A1 | 12/2018 | Elliot et al. | |
| 2019/0118810 A1 | 4/2019 | Paris et al. | |
| 2019/0212155 A1 | 7/2019 | Gordon et al. | |
| 2019/0220462 A1 | 7/2019 | Sun et al. | |
| 2019/0302767 A1 | 10/2019 | Sapp et al. | |
| 2019/0367022 A1 | 12/2019 | Zhao et al. | |
| 2021/0200221 A1 * | 7/2021 | Omari | G05D 1/0212 |

FOREIGN PATENT DOCUMENTS

| | | | |
|---|---|---|---|
| JP | 2020-042599 | 3/2020 | |
| KR | 2017-0044940 | 4/2017 | |
| KR | 2019-0073038 | 6/2019 | |
| WO | WO-2019231455 A1 * | 12/2019 | B60W 10/04 |
| WO | WO 2020/079066 | 4/2020 | |

* cited by examiner

TRAJECTORY PLANNING OF VEHICLES USING ROUTE INFORMATION

FIELD OF THE INVENTION

This description relates to trajectory planning of vehicles using route information.

BACKGROUND

A path an autonomous vehicle takes depends on the path of the objects (e.g., other nearby vehicles, bicycles, pedestrians). Trajectory estimates (e.g., the following 5-10 seconds and/or 50-100 meters) of the objects are based on an estimated position and velocity of the object as determined by sensors onboard the autonomous vehicle. However, these trajectory estimates do not account for the expected behavior of the objects. Therefore, over reliance of these trajectory estimates during the travel of the autonomous vehicle can force the autonomous vehicle to have to recompute its path to avoid a collision and/or less than optimal driving conditions (e.g., being stuck behind a vehicle).

DETAILED DESCRIPTION

Figure 1:
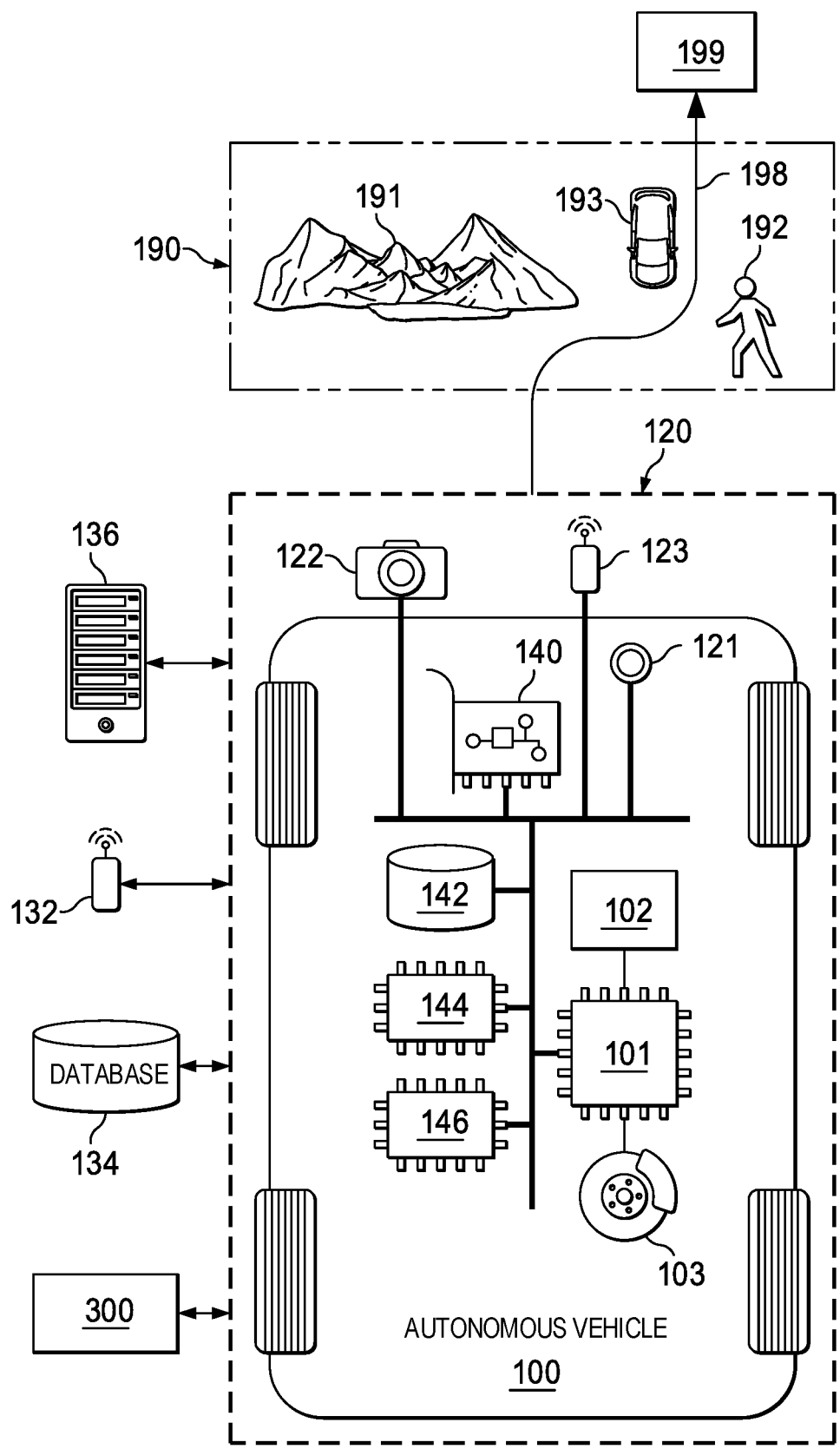
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. Autonomous Vehicle Architecture
4. Path Planning
5. Trajectory Estimation of Objects in the Environment General Overview Knowledge of the expected route an object is likely to follow helps the autonomous vehicle determine its own path. For example, the autonomous vehicle may be informed that a public transportation bus (or trolley) on a fixed route with a particular model number is on the left hand side of the autonomous vehicle. The autonomous vehicle may then query a database to retrieve the expected route of this particular public transportation bus. If the public transportation bus appears to be moving along this expected route, and the expected route indicates a left hand turn is going to be taken at the upcoming intersection, the autonomous vehicle may conclude, with an appropriate degree of certainty, that the public transportation bus is about to turn left and that the likelihood of the public transportation bus moving into the current lane of the autonomous vehicle is very low. The autonomous vehicle can then use this information to determine that staying in the current lane is safe.

As a further example, if the vehicle in front of the autonomous vehicle is identified as a UPS truck that is about to stop at a destination, the autonomous vehicle is informed of this so it can switch lanes to avoid the UPS truck. As another example, if the vehicle in front of the autonomous vehicle is identified as a student driver vehicle, the autonomous vehicle can maintain a further distance from the student driver vehicle in the case of sudden stops or abrupt movements.

Some of the advantages of these techniques include reducing the need to recompute the path of the autonomous vehicle. Furthermore, by incorporating route information of the objects, the autonomous vehicle can remove unknowns from the path planning process. This directly results in a safer ride and smoother ride for the passengers within the autonomous vehicle. The objects in the environment would also be safer since the autonomous vehicle would try to avoid interfering with the expected route of the objects.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

The term "over-the-air (OTA) client" includes any AV, or any electronic device (e.g., computer, controller, IoT device, electronic control unit (ECU)) that is embedded in, coupled to, or in communication with an AV.

The term "over-the-air (OTA) update" means any update, change, deletion or addition to software, firmware, data or configuration settings, or any combination thereof, that is delivered to an OTA client using proprietary and/or standardized wireless communications technology, including but not limited to: cellular mobile communications (e.g., 2G, 3G, 4G, 5G), radio wireless area networks (e.g., WiFi) and/or satellite Internet.

The term "edge node" means one or more edge devices coupled to a network that provide a portal for communication with AVs and can communicate with other edge nodes and a cloud based computing platform, for scheduling and delivering OTA updates to OTA clients.

The term "edge device" means a device that implements an edge node and provides a physical wireless access point (AP) into enterprise or service provider (e.g., VERIZON, AT&T) core networks. Examples of edge devices include but are not limited to: computers, controllers, transmitters, routers, routing switches, integrated access devices (IADs), multiplexers, metropolitan area network (MAN) and wide area network (WAN) access devices.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Autonomous vehicles have advantages over vehicles that require a human driver. One advantage is safety. For example, in 2016, the United States experienced 6 million automobile accidents, 2.4 million injuries, 40,000 fatalities, and 13 million vehicles in crashes, estimated at a societal cost of $910+ billion. U.S. traffic fatalities per 100 million miles traveled have been reduced from about six to about one from 1965 to 2015, in part due to additional safety measures deployed in vehicles. For example, an additional half second of warning that a crash is about to occur is believed to mitigate 60% of front-to-rear crashes. However, passive safety features (e.g., seat belts, airbags) have likely reached their limit in improving this number. Thus, active safety measures, such as automated control of a vehicle, are the likely next step in improving these statistics. Because human drivers are believed to be responsible for a critical pre-crash event in 95% of crashes, automated driving systems are likely to achieve better safety outcomes, e.g., by reliably recognizing and avoiding critical situations better than humans; making better decisions, obeying traffic laws, and predicting future events better than humans; and reliably controlling a vehicle better than a human.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. We use the term "operational command" to mean an executable instruction (or set of instructions) that causes a vehicle to perform an action (e.g., a driving maneuver). Operational commands can, without limitation, including instructions for a vehicle to start moving forward, stop moving forward, start moving backward, stop moving backward, accelerate, decelerate, perform a left turn, and perform a right turn. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX®, Wi-Fi®, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

In an embodiment, the AV system 120 receives and enforces a privacy level of a passenger, e.g., specified by the passenger or stored in a profile associated with the passenger. The privacy level of the passenger determines how particular information associated with the passenger (e.g., passenger comfort data, biometric data, etc.) is permitted to be used, stored in the passenger profile, and/or stored on the cloud server 136 and associated with the passenger profile. In an embodiment, the privacy level specifies particular information associated with a passenger that is deleted once the ride is completed. In an embodiment, the privacy level specifies particular information associated with a passenger and identifies one or more entities that are authorized to access the information. Examples of specified entities that are authorized to access information can include other AVs, third party AV systems, or any entity that could potentially access the information.

A privacy level of a passenger can be specified at one or more levels of granularity. In an embodiment, a privacy level identifies specific information to be stored or shared. In an embodiment, the privacy level applies to all the information associated with the passenger such that the passenger can specify that none of her personal information is stored or shared. Specification of the entities that are permitted to access particular information can also be specified at various levels of granularity. Various sets of entities that are permitted to access particular information can include, for example, other AVs, cloud servers 136, specific third party AV systems, etc.

In an embodiment, the AV system 120 or the cloud server 136 determines if certain information associated with a passenger can be accessed by the AV 100 or another entity. For example, a third-party AV system that attempts to access passenger input related to a particular spatiotemporal location must obtain authorization, e.g., from the AV system 120 or the cloud server 136, to access the information associated with the passenger. For example, the AV system 120 uses the passenger's specified privacy level to determine whether the passenger input related to the spatiotemporal location can be presented to the third-party AV system, the AV 100, or to another AV. This enables the passenger's privacy level to specify which other entities are allowed to receive data about the passenger's actions or other data associated with the passenger.

Figure 2:
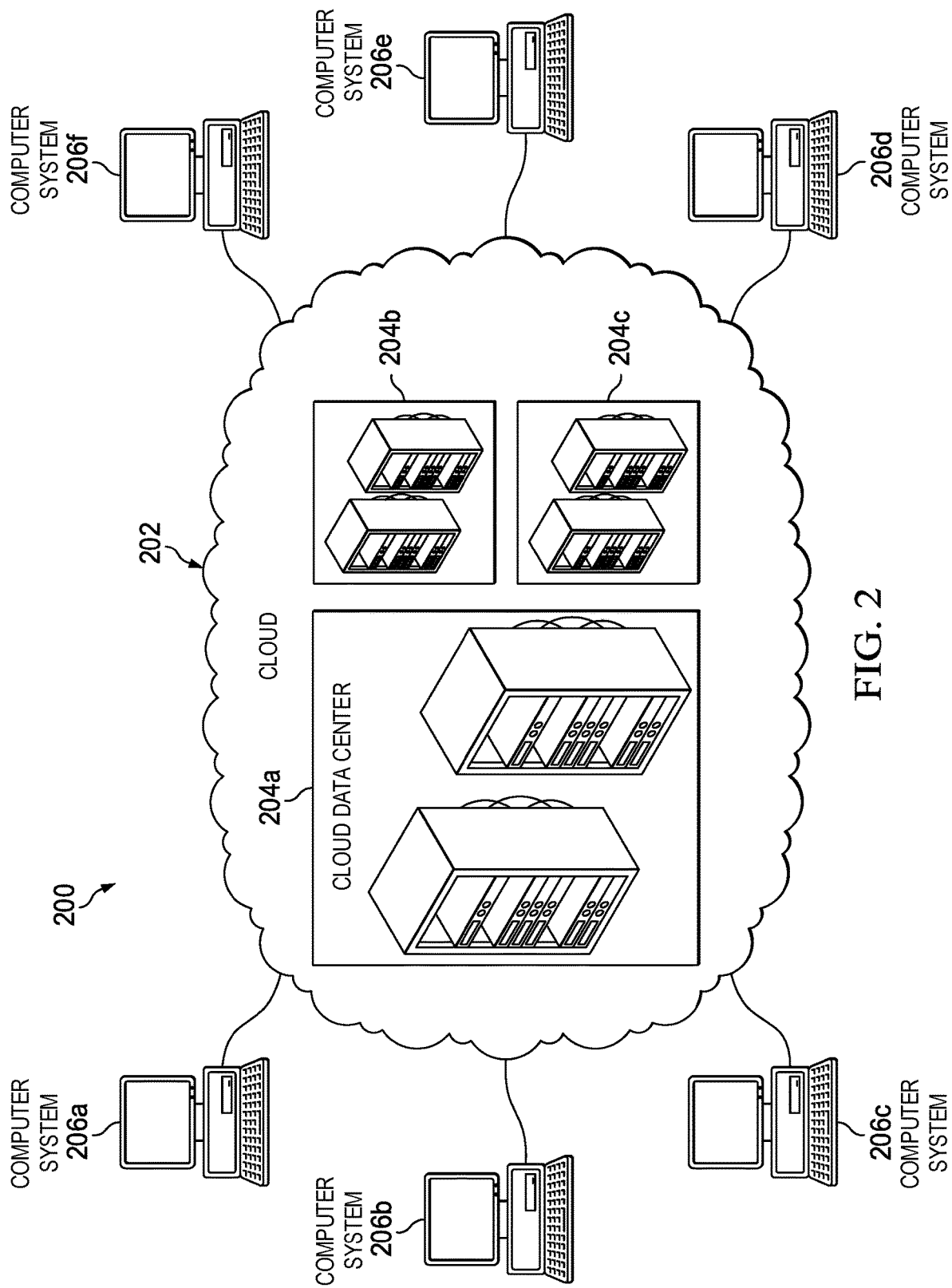
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
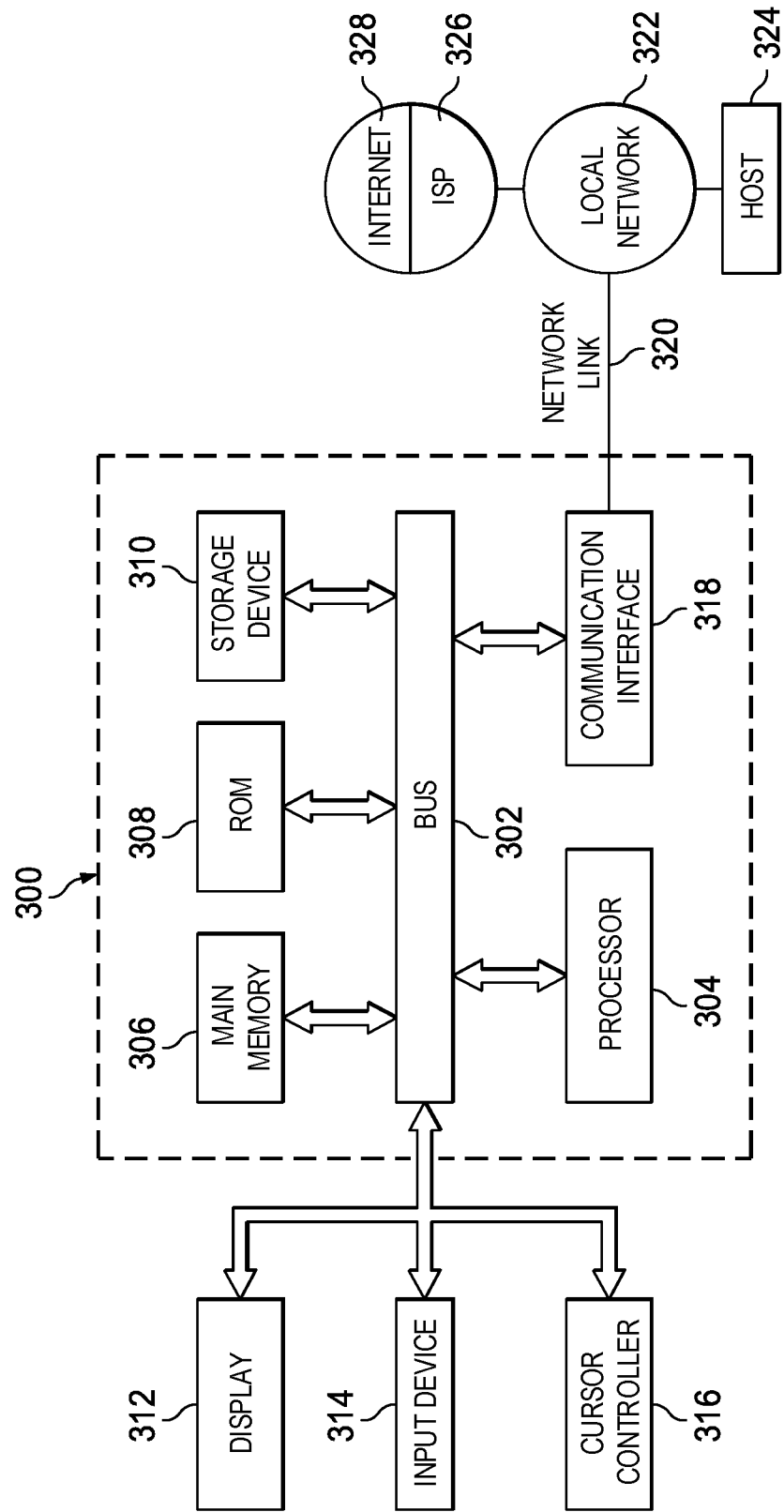
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
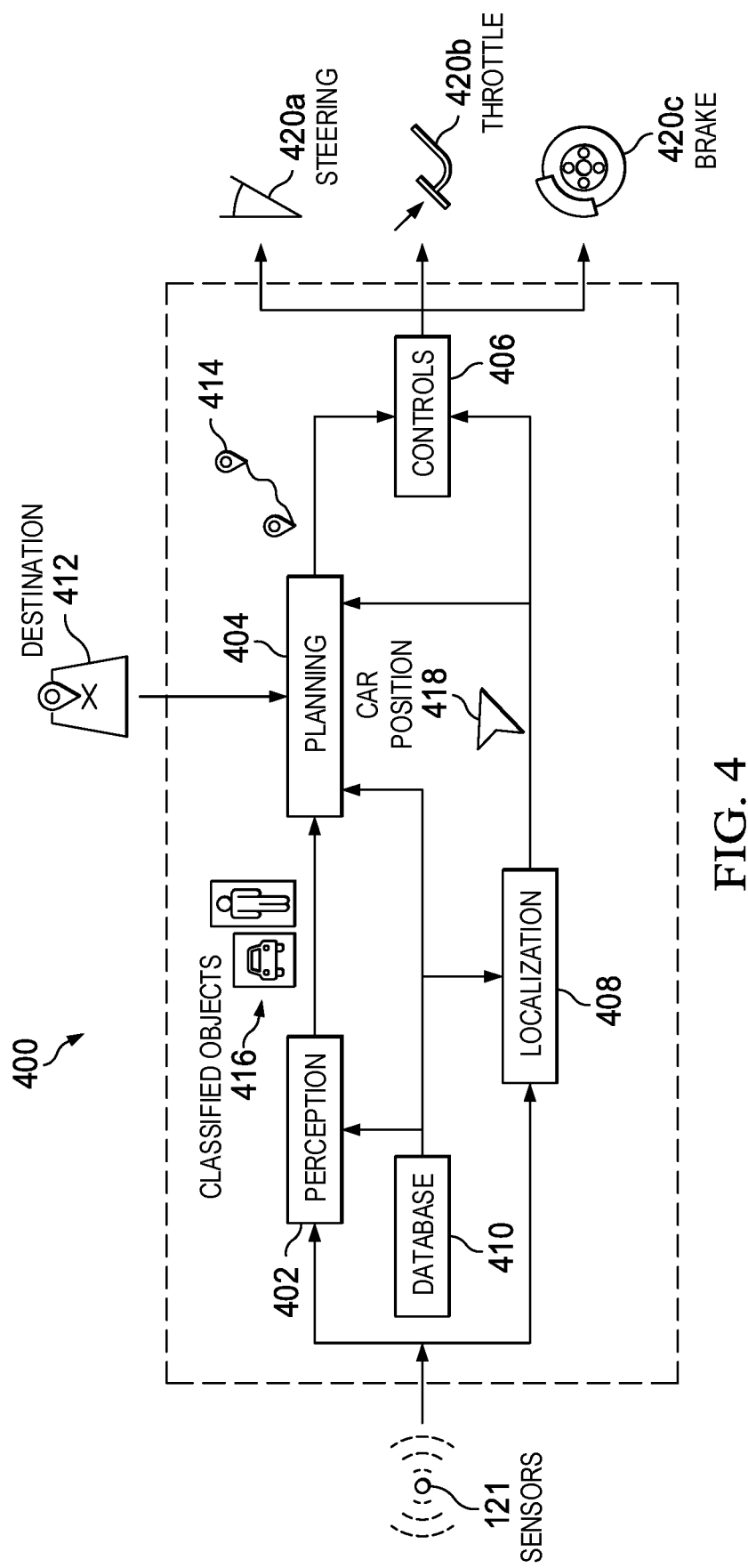
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things). Each of the modules 402, 404, 406, 408, and 410 is sometimes referred to as a processing circuit (e.g., computer hardware, computer software, or a combination of the two). A combination of any or all of the modules 402, 404, 406, 408, and 410 is also an example of a processing circuit.

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404. For example, the one or more sensors 121 may determine that a UPS delivery vehicle is in front of the AV 100.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Path Planning

Figure 5:
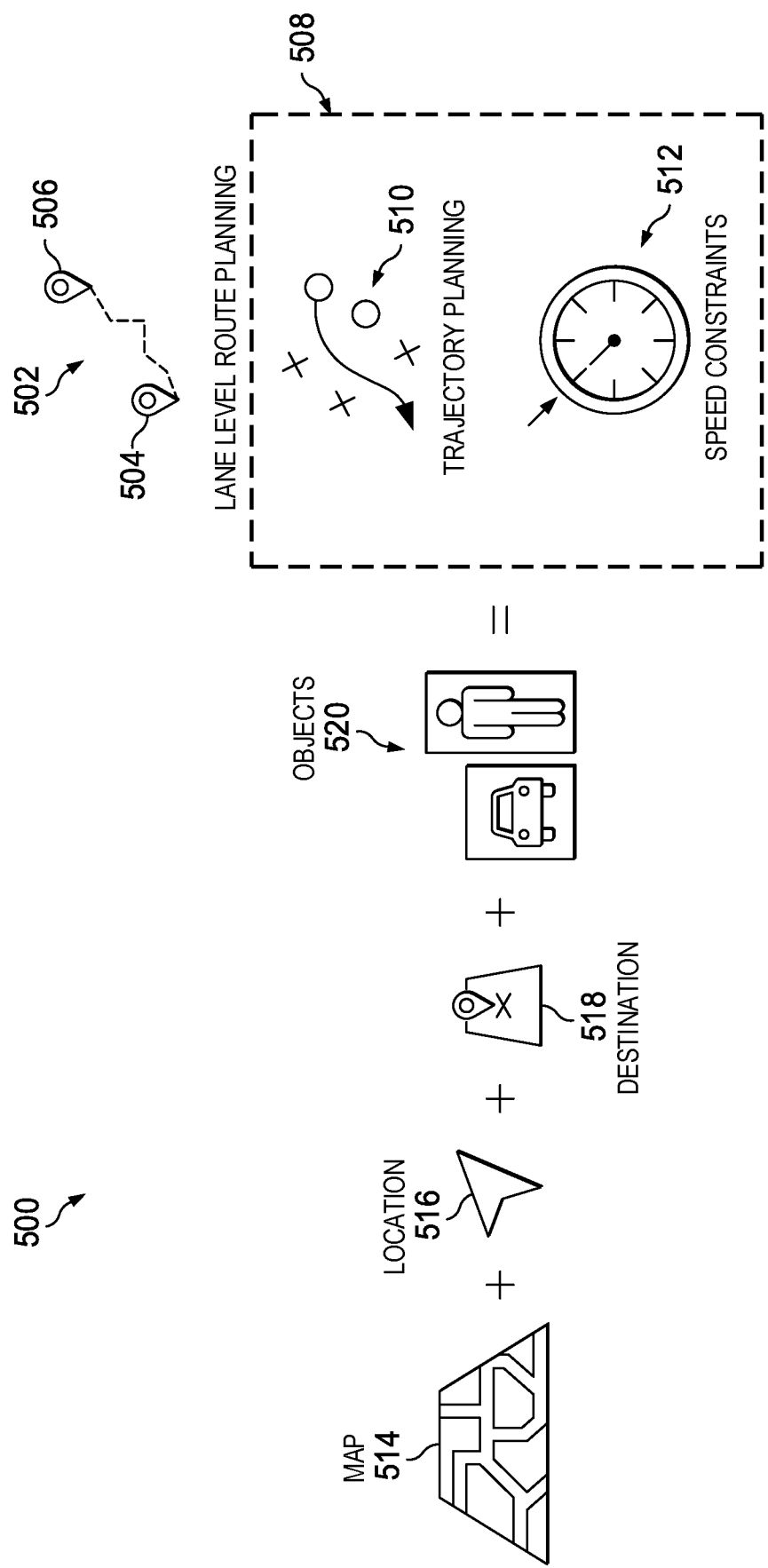
FIG. 5 shows a block diagram of the relationships between inputs and outputs of a planning module.

FIG. 5 shows a block diagram 500 of the relationships between inputs and outputs of a planning module 404 (e.g., as shown in FIG. 4). In general, the output of a planning module 404 is a route 502 from a start point 504 (e.g., source location or initial location), and an end point 506 (e.g., destination or final location). The route 502 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 502 includes "off-road" segments such as unpaved paths or open fields.

In addition to the route 502, a planning module also outputs lane-level route planning data 508. The lane-level route planning data 508 is used to traverse segments of the route 502 based on conditions of the segment at a particular time. For example, if the route 502 includes a multi-lane highway, the lane-level route planning data 508 includes trajectory planning data 510 that the AV 100 can use to choose a lane among the multiple lanes, e.g., based on whether an exit is approaching, whether one or more of the lanes have other vehicles, or other factors that vary over the course of a few minutes or less. For residential roads, a mail delivery vehicle may make frequent stops in the right-most lane. Similarly, in some implementations, the lane-level route planning data 508 includes speed constraints 512 specific to a segment of the route 502. For example, if the segment includes pedestrians or un-expected traffic, the speed constraints 512 may limit the AV 100 to a travel speed slower than an expected speed, e.g., a speed based on speed limit data for the segment.

In an embodiment, the inputs to the planning module 404 includes database data 514 (e.g., from the database module 410 shown in FIG. 4), current location data 516 (e.g., the AV position 418 shown in FIG. 4), destination data 518 (e.g., for the destination 412 shown in FIG. 4), and object data 520 (e.g., the classified objects 416 as perceived by the perception module 402 as shown in FIG. 4). In some embodiments, the database data 514 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane." As a further example, a rule that says, "if the vehicle in front of the AV 100 is a mail delivery vehicle, attempt a pass maneuver" can have a lower priority than "if within a no-passing zone, remain within the current lane."

Trajectory Estimation of Objects in the Environment

Figure 6:
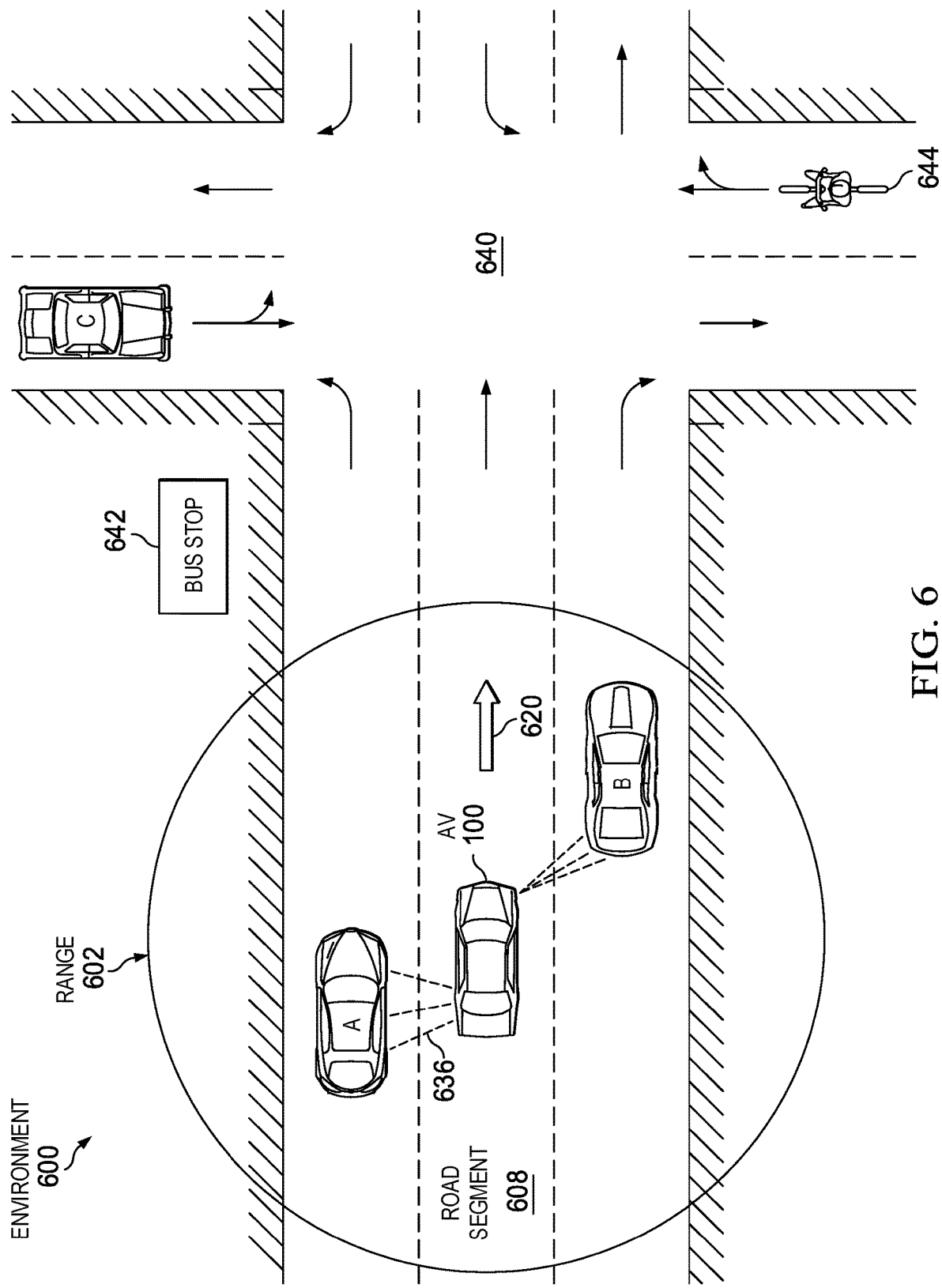
FIG. 6 illustrates the autonomous vehicle approaching an intersection.

FIG. 6 shows the AV 100 traveling along a road segment 608 within an environment 600. Various moving objects may interfere with the route or path of the AV 100 during the travel of the AV 100. For example, another vehicle, pedestrian, or a bicycle could interfere with the route of the AV 100. As shown in FIG. 6, two objects in the environment 600, vehicle "A" and vehicle "B" are both within a range 602 of AV 100. The range 602 is a subset of an environment 600 where the AV 100 "sees" objects that could interfere with the route of the AV 100.

For example, vehicle "B" is 5 feet in front (front being denoted by the forward direction of travel of the AV 100) and in the right-most travel lane and vehicle "A" is to the immediate left of AV 100 and in the left-most travel lane. In some embodiments, a radius of 20 m around AV 100 represents the range 602. In some embodiments, the range 602 spans an area AV 100 can traverse in the following 5-8 seconds. In some embodiments, the range 602 is biased in front of AV 100 such that there is more emphasis ahead of AV 100 than behind AV 100. In this way, the range 602 is dependent on the velocity (speed and heading) of AV 100.

Sensors of the AV 100 (e.g., sensors 121) detect the presence of both vehicle "A" and vehicle "B" (e.g., the LiDAR 123 "sees" vehicle "A" as denoted by the ray tracing of light 636). This information is processed by the perception module 402 for object classification 416 as described with reference to FIG. 4. However, other sensors of AV 100 can be used to detect the presence of vehicle "A" and "B." For example, RADAR, cameras, proximity sensors, and/or any sensors previously described can also be used.

However, merely knowing that vehicle "A" is to the left-hand-side of AV 100 is not sufficient to determine the behavior of vehicle "A." Additionally, the perception module 402 can determine a trajectory of the object representative of the next few seconds (e.g., 2-5 seconds) of travel of the object. The trajectory may establish that a car to the left of the AV 100 is travelling at 20 mph and heading straight but it is unknown if the driver is going to make an abrupt maneuver, e.g., switch lanes to take an upcoming turn.

For example, if the planning module of the AV 100 dictates that AV 100 should turn left at the upcoming intersection 640, the AV 100 may determine that the best course of action is to slow down and move into the left-most lane behind vehicle "A." However, if it were known that vehicle "A" was a bus that was about to stop at the bus stop 642, AV 100 may determine the best course of action is to remain in the current lane and move into the left-most lane after vehicle "A" has slowed to a stop at the bus stop 642. Instead, if AV 100 had slowed down and moved behind vehicle "A" then AV 100 would either need to wait behind vehicle "A" at the bus stop 642 or perform a pass maneuver. Neither of these would be ideal from a time and/or passenger comfort standpoint.

Knowledge of an expected route that vehicle "A" is expected to take could be used to determine which lane the AV 100 should be in at any given time. An expected route is defined as a fixed, pre-planned, scheduled, unalterable, or otherwise derived based on a fixed, pre-planned, scheduled, or unalterable route that an object is going to take. In particular, this information is used by the planning module 404 to update the lane-level route planning data 508 (previously described with reference to FIG. 5) of the route 502. While the overall route 502 of the AV 100 is unlikely to be changed with knowledge of the expected route of objects in the environment 600, such changes are possible. For example, an expected route of vehicle "A" might indicate that it is expected to stop at the bus stop 642 then proceed left at the intersection 640. Knowledge of this expected route by the planning module 404 would allow planning module 404 to determine the optimal instantaneous lane position for the AV 100.

The expected route may be a one-time or temporary route (e.g., recreational drivers, delivery services, construction vehicles), or a reoccurring route (e.g., postal services, busses). In addition, knowledge of distances and speeds along the expected route enables the perception module 402 to approximate a future time when the object is expected to be in that position along the expected route. For example, the future time may represent at least 5 seconds in the future, but in some embodiments, the expected route defines the expected position of the object over the course of the next minute. In some embodiments, the expected position vs. time may be estimated by the perception module 402 with knowledge of current speed limits, the current trajectory of the object, and/or traffic congestion.

An important aspect of the expected route information is that it provides position estimates of the object at a future time. For example, knowing the expected position of the object 10 seconds into the future is very helpful. In most embodiments, knowing the position of the object 5-8 seconds into the future provides sufficient accuracy for fusing with the object's trajectory data to generate an improved prediction of the object's future position. Future times much longer than 10 second can be less helpful because the permutations of all possible movements of the objects within the environment 600 are large and can be difficult to predict with accuracy, however, times longer than 10 seconds into the future are sometimes used.

The expected route the object is expected to take can be determined in several ways. One method is to directly communicate with the object to retrieve this information using vehicle-to-vehicle communications. For example, in some embodiments, vehicle "A" wirelessly broadcasts (e.g., over WiFi, Bluetooth, or low power AM/FM frequencies) identifying information that includes its expected route. This is advantageous from a safety perspective for commercial drivers since it allows cars in the vicinity of them to be aware of their next moves. In some embodiments, the route information is communicated from a transceiver of a mobile device within vehicle "A." For example, when a driver or passenger within vehicle "A" uses their smart phone to provide directions to a destination, this direction information is provided to the AV 100 wirelessly via WiFi etc. In this case, a transceiver of the smart phone broadcasts the direction information to AV 100.

However, in some embodiments, the identifying information will not include the expected route of the object. As long as the identifying information reveals other characteristics regarding the object, a transceiver of AV 100 can query a remote server and/or the internet to determine the expected route of the object using whatever characteristics are known. In some embodiments, the transceiver communicates with external servers associated with vehicle "A" and/or vehicle "B" through the public Internet.

For example, if the identifying information reveals that vehicle "A" is a public transportation bus, the transceiver of AV 100 can query the public transportation server to retrieve a map of all buses that have an expected path that traverses through the bus's approximate current position. Here, the current position is estimated relative to AV 100's known current position. However, in some embodiments, the current position is approximated to be the current position of the AV 100 itself.

In some embodiments, the route information is retrieved from a server associated with the object. For example, route information for UPS delivery vehicles is obtained from UPS servers. Similarly, route information for Uber vehicles is obtained from Uber servers. This can be performed using an API. In some embodiments, an agreement is in place to allow the transceiver of AV 100, or the server associated with the AV 100, access to the route information. In some embodiments, expected route data is downloaded from the server and locally stored. In some embodiments, this data is processed for further classification of the object. In some cases, this data is shared with nearby autonomous vehicles.

Sometimes this query may reveal more than one unique solution. For example, two public transportation buses may traverse through the current position along their paths. In these cases, other aspects of the expected routes can be considered. The method can also compare the velocity of the object with the expected velocity along the expected route. For example, an expected route that represents a bus stop upcoming but the vehicle does not appear to be slowing down, may indicate that the expected route is incorrect. Another indication is lane position. For example, a vehicle expected to turn left, but in the right-most lane, may not be on the expected route. Further aspects include the times of the day (or days of the week, or seasons of the year) that the object is expected to be along the expected route. If the perception module 402 cannot uniquely establish an expected route, the AV 100 may not use this information in the planning module 404. In some embodiments, when multiple expected paths are identified, the planner module 404 considers the possibility that the object might follow any of the paths and the combination of all possible routes is assumed.

In some embodiments, the expected route may contradict the current position and/or velocity of the object. When the trajectory of the object is compared to the expected route of the object, the perception module 402 may determine that the expected route information does not sense. For example, if the expected route indicates the vehicle should be across town at the current time, then the expected route information is deemed inaccurate or unreliable. However, if the current position of the object is along the expected route, the perception module 402 may conclude that the object is traveling along the expected route.

A confidence level is assigned based on an accuracy and/or reliability of the expected route of the object. This confidence level is provided as input to the planning module 404 where the expected route of the object is given weight (or emphasis) based on its associated confidence level. In some embodiments, the planning model 404 uses a Kalman filter approach to incorporate this confidence level into the planning process. If the confidence is low (e.g., below 50% confidence) the information may not be used. However, if the expected route data appears reliable (e.g., a confidence level greater than 70%), the trajectory information of the object is fused with the expected route information to improve the expected position of the object over the next 5-8 seconds.

In some embodiments, the perception module 402 determines how reliable the expected route information is. For example, an expected route that was last updated 10 seconds ago may be given more weight than a route that was last updated a year ago. In some embodiments, the reputation of the data source is also considered. For example, a source from a secure site may be given more weight than a source from an unsecure site. A source that was recently compromised (e.g., from a hacking event) may not be considered or accessed at all.

In some embodiments, the information obtained from the vehicle or a mobile device associated with the object is sufficient to uniquely identify the object. For example, a car broadcasting its location and route is sufficient information to determine the expected route. In other embodiments, the classification module may determine that a car is to the left of the AV 100 (e.g., LiDAR may be used to identify the object as a car), but little is otherwise known about the car. In such embodiments, the AV 100 can instruct the onboard sensors to take a closer look at the car to determine if a company logo or other vehicle identification exists. For instance, knowledge of a company logo, vehicle identification, color, detection of passengers, sound of the vehicle, open/closed doors, blinkers on, etc. represent a state of the car and can be used to filter the set of all possible matches.

For example, the classification module of AV 100 may determine that vehicle "B" in FIG. 6 is a truck. AV 100 may then instruct the classification module to perform a second classification to see if any identifying information (or additional information) is obtainable. The second classification may reveal that the truck is brown and has letters "UPS" on the side. This information can be used to determine that this is likely a UPS delivery truck. Furthermore, when additional information of the object is received, it may be useful to store this information for later use (e.g., store in a database). In some embodiments, this information can be transmitted to a Machine Learning module within the system pipeline for improved object classification. This additional information can be used to train objects with similar signatures or features.

Upon learning that vehicle "B" is a UPS truck, the AV 100 can then query the UPS server to determine the scheduled delivery routes for the UPS trucks in the area. This may result in two or more possible matches as described above. However, using additional information such as the current trajectory of the UPS truck, these choices can be filtered down to one unique route. This becomes the expected route of vehicle "B."

If the expected route of vehicle "B" indicates that vehicle "B" is about to proceed straight through the intersection 640, then AV 100 is alerted that vehicle "B" may either move into the travel lane of the AV 100, or perform an illegal maneuver of proceeding straight through the intersection 640 despite being in a right turn only lane. By being on alert, AV 100 is advised to maintain a safe distance from vehicle "B." For example, the controls module 406 could decelerate the vehicle (e.g., less throttle 420b and/or apply brakes 420c) in response to being on alert.

In some embodiments, the perception module 402 determines the uncertainty of the updated trajectory of the vehicle or object based on fusing the trajectory information with the expected route information. For example, if the vehicle appears to be moving fast but the expected route indicates an approaching turn, a higher uncertainty score may be assigned to indicate that the trajectory of the vehicle may not be accurate. On the other hand, if the vehicle is slowing down in the right lane of travel and the route indicates a right hand turn is approaching, a higher confidence (lower uncertainty) score may be assigned to the updated trajectory indicating that the trajectory is accurate. Such information can be used to influence the path the AV 100 takes as defined by the planning module 404.

In most embodiments, the perception module 402 transmits the updated trajectory of the object to the planning module 404 to update the route and/or instantaneous lane position of the AV 100. Sometimes, the updated trajectory calculation is performed in the cloud or on a remote server and transmitted to a controller onboard the AV 100 for processing.

Referring again to FIG. 6, as the AV 100 approaches the intersection 640, a bicycle 644 enters the range 602. The classification module may determine that the bicycle 644 is associated with "Uber Eats." By querying the "Uber Eats" server, the perception module 402 determines that the bicycle 644 is going to proceed straight through the intersection 640. In this way, AV 100 is alerted that the bicycle will likely cross the path of the AV 100. The controls module 406 controls the AV 100 to slow down and/or yield to the bicycle 644.

Similarly, as vehicle "C" becomes in range 602, the AV 100 learns, by way of the classification pipeline, that vehicle "C" is a firetruck with sirens activated. For example, the onboard microphones can be used to determine that the siren is associated with vehicle "C." The transceiver AV 100 queries an online data for nearby active fire alarms and determines that the firetruck is likely to turn left at the intersection 640. In this case, the controls module 406 of the AV 100 controls the AV 100 to slow down and yield to vehicle "C" regardless of traffic signals. Furthermore AV 100 expects vehicle "C" to enter the travel lane of the AV 100 and is on alert for such maneuver by vehicle "C."

Figure 7A:
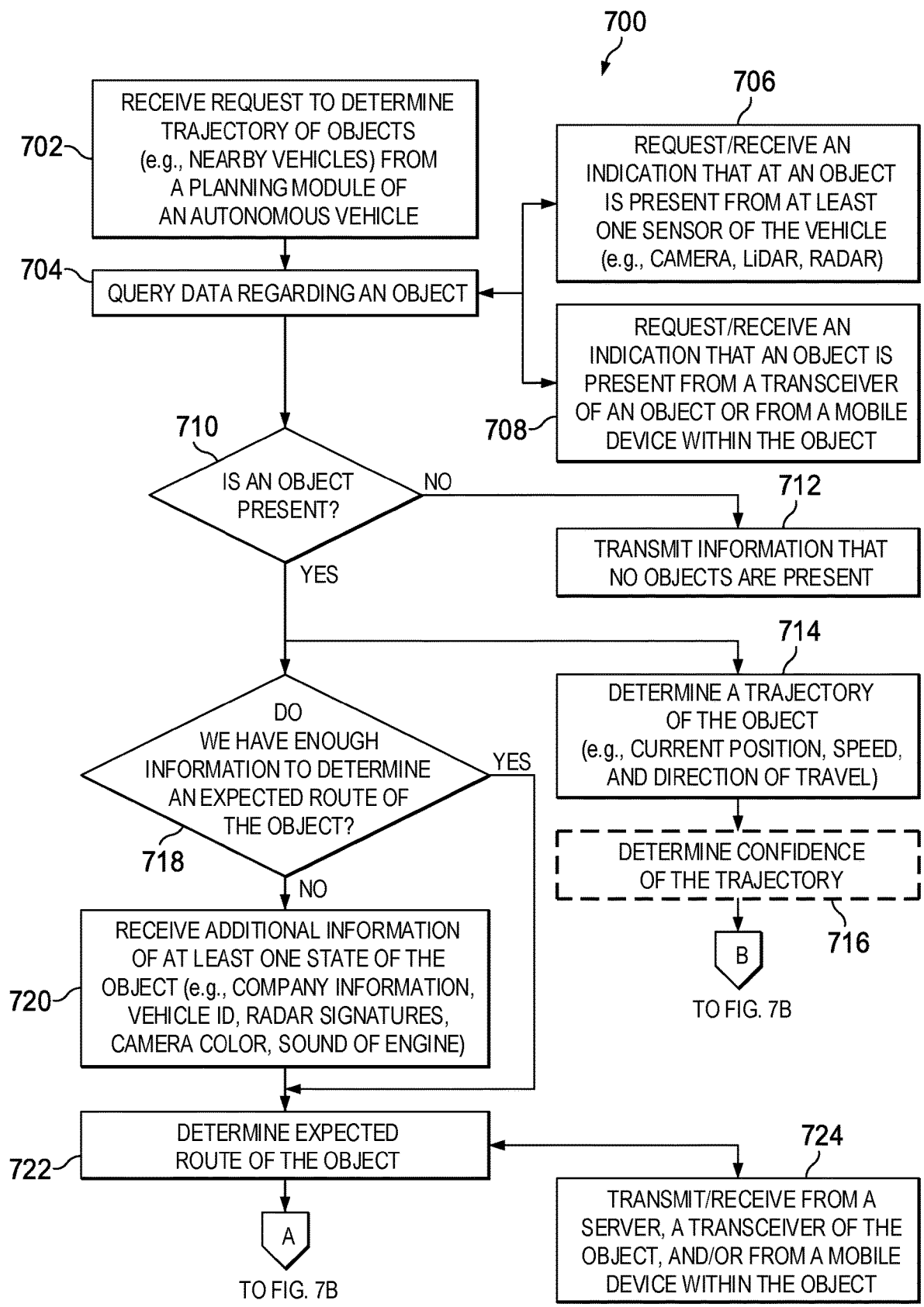
FIGS. 7A and 7B are decision trees of an autonomous vehicle.
Figure 7B:
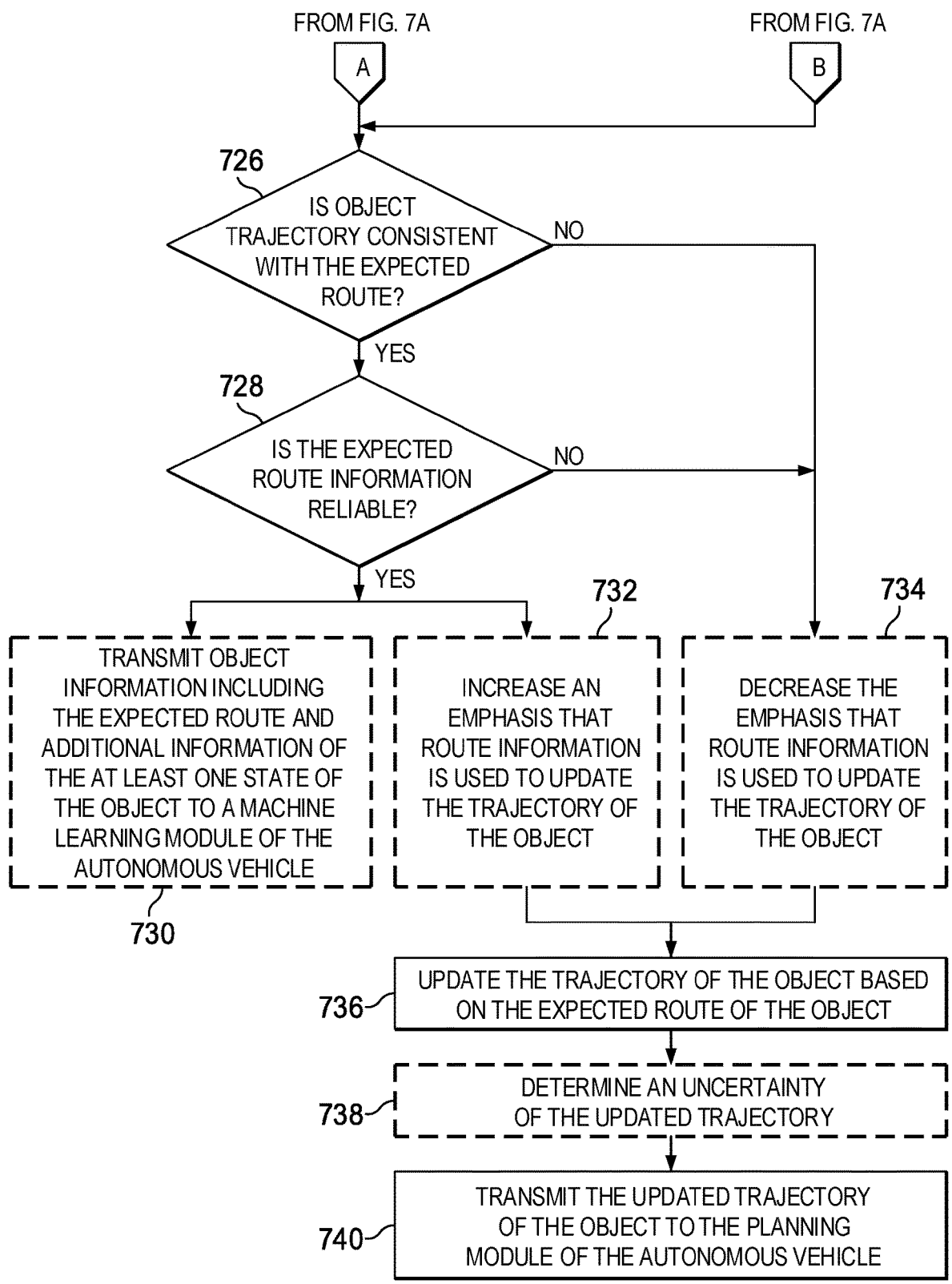

FIGS. 7A and 7B are decision trees for a process 700 of the AV 100. The process receives a request to determine a trajectory of objects (e.g., nearby vehicles) from either a perception module 402 or a planning module 404 of the AV 100 (702). The classification module queries data regarding objects (704). This can include requesting and/or receiving an indication that at an object is present from at least one sensor of the vehicle (e.g., Camera, LiDAR, RADAR) (706). This can also include requesting and/or receiving an indication that an object is present from a transceiver of an object or from a mobile device within the object (708). The process 700 determines if an object is present (710). If an object is not present, information is transmitted that no objects are present (712).

However, if an object is present, two parallel computations are performed. One is that a trajectory of the object (e.g., current position, speed, and direction of travel) is determined (714) and a confidence of the trajectory is determined (716). The second computation is to determine if the received data is sufficient to determine the expected route of the object (718). If not, additional information of at least one state of the object (e.g., company info, vehicle id, RADAR signatures, camera color, sound of engine) is received (e.g., by a second classification process) (720). Using this information, an expected route of the object is determined (722). This is determined, at least in part, by transmitting and/or receiving information from a server, a transceiver of the object, and/or from a mobile device within the object (724).

The object's trajectory is compared to expected route (e.g., is object where it should be? is the object's speed consistent with expected speed along expected route?) (726). If yes, a reliability of the expected route information (e.g., age of data, reputation of data source) is determined (728). If the expected route information is reliable, object information including the expected route and additional information of the at least one state of the object is transmitted to a machine learning module of the autonomous vehicle (730). Since the expected route information is reliable, an emphasis associated with the expected route is increased such that the expected route information plays a substantial factor in the updated trajectory determination (732). On the other hand, if the expected route data is inconsistent or unreliable, the process decreases the emphasis that route information is used to update the trajectory of the object (734).

The trajectory of the object is updated based on the expected route of the object (736) using the particular emphasis defined in steps 732 or 734. An uncertainty of the updated trajectory is determined (738). The updated trajectory of the object is transmitted to the planning module of the autonomous vehicle, e.g., AV 100 (740).

Figure 8:
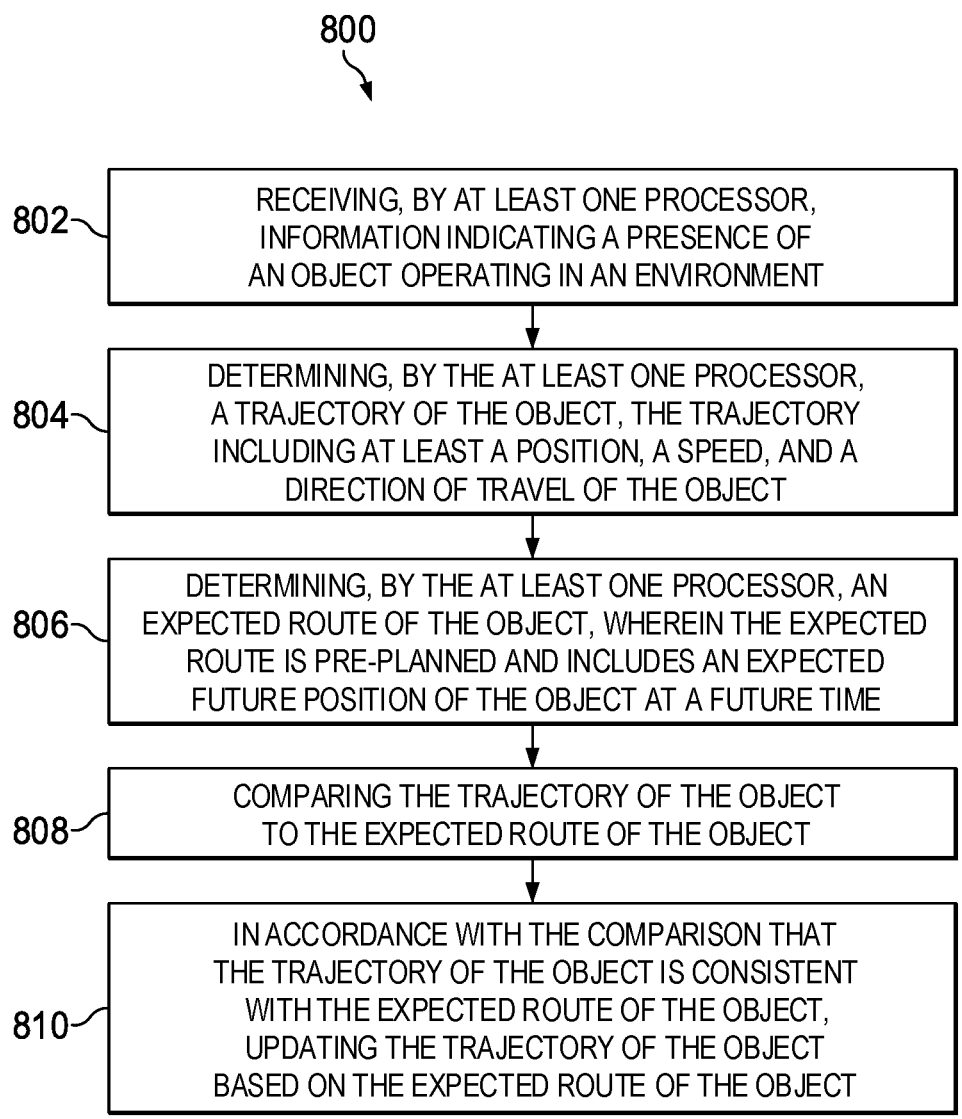
FIG. 8 is a flowchart for improving the trajectory estimates of an object in an environment.

FIG. 8 is a flowchart of a method 800 for improving the trajectory estimates of an object in an environment. The method includes receiving, by at least one processor, information indicating a presence of an object operating in an environment (802). The at least one processor determines a trajectory of the object, where the trajectory including at least a position, a speed, and a direction of travel of the object (804). An expected route of the object is determined, where the expected route is pre-planned and includes an expected future position of the object at a future time (806). The trajectory of the object is compared to the expected route of the object (808). And in accordance with the comparison that the trajectory of the object is consistent with the expected route of the object, the trajectory of the object is updated based on the expected route of the object (810).

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method comprising:
    receiving, by at least one processor, information indicating a presence of an object operating in an environment of a vehicle during a travel of the vehicle;
    determining, by the at least one processor, a trajectory of the object representative of a future travel of the object based on sensor data of one or more sensors of the vehicle while the vehicle is driving, the trajectory including at least a position, a speed, or a direction of the future travel of the object;
    determining, by the at least one processor, an expected route of the object based on a current trajectory of the object, wherein the expected route of the object is a pre-planned route for the object to take and includes an expected future position of the object at a future time;
    comparing, by the at least one processor, the trajectory of the object to the expected route of the object;
    determining, by the at least one processor, a confidence level associated with the expected route of the object based on a result of the comparing;
    updating, by the at least one processor, the trajectory of the object based on the expected route of the object and the confidence level associated with the expected route of the object; and
    operating the vehicle based on the updated trajectory of the object.

2. The method of claim 1, wherein determining the expected route of the object includes receiving route information from a server.

3. The method of claim 1, wherein the determination of the expected route is based on received route information from a transceiver or a mobile device associated with the object.

4. The method of claim 1, wherein the future time is at least 5 seconds in the future.

5. The method of claim 1, wherein comparing the trajectory of the object to the expected route of the object includes determining whether the position of the object is an expected position along the expected route.

6. The method of claim 1, wherein comparing the trajectory of the object to the expected route of the object includes determining whether a velocity of the object is an expected velocity along the expected route.

7. The method of claim 1, wherein the received information indicating the presence of the object operating in the environment of the vehicle is from at least one sensor of the vehicle.

8. The method of claim 1, wherein the at least one processor is part of a remote server.

9. The method of claim 1, wherein the received information indicating the presence of the object operating in the environment of the vehicle is from a transceiver or mobile device associated with the object.

10. The method of claim 1, further comprising:
    determining if the received information indicating the presence of the object operating in the environment of the vehicle is sufficient to determine the expected route of the object; and
    in accordance with the determination that the received information is not sufficient to determine the expected route of the object, receiving additional information of at least one state of the object.

11. The method of claim 10, wherein the received additional information of the at least one state of the object is from at least one sensor of the vehicle.

12. The method of claim 10, further comprising, in accordance with the determination that the received information indicating the presence of the object operating in the environment of the vehicle is not sufficient to determine the expected route of the object, transmitting the received additional information of the at least one state of the object to a machine learning module for object classification.

13. The method of claim 1, further comprising, in accordance with the comparison that the trajectory of the object is consistent with the expected route of the object, determining an uncertainty of the updated trajectory.

14. The method of claim 1, further comprising transmitting the updated trajectory information of the object.

15. A non-transitory computer-readable storage medium comprising at least one program for execution by at least one processor of a first device, the at least one program including instructions which, when executed by the at least one processor, cause the first device to perform operations comprising:
    receiving information indicating a presence of an object operating in an environment of a vehicle during a travel of the vehicle;
    determining a trajectory of the object representative of a future travel of the object based on sensor data of one or more sensors of the vehicle while the vehicle is driving, the trajectory including at least a position, a speed, or a direction of the future travel of the object;
    determining an expected route of the object, wherein the expected route of the object is a pre-planned route for the object to take and includes an expected future position of the object at a future time;
    comparing the trajectory of the object to the expected route of the object;
    determining a confidence level associated with the expected route of the object based on a result of the comparing;
    updating the trajectory of the object based on the expected route of the object and the confidence level associated with the expected route of the object; and
    operating the vehicle based on the updated trajectory of the object.

16. A vehicle comprising:
    at least one transceiver configured to transmit and receive route information of an object; and at least one processor communicatively coupled to the at least one transceiver and configured to execute computer executable instructions to perform operations comprising:
  receiving information indicating a presence of the object operating in an environment of a vehicle during a travel of the vehicle;
  determining a trajectory of the object representative of a future travel of the object based on sensor data of one or more sensors of the vehicle while the vehicle is driving, the trajectory including at least a position, a speed, or a direction of the future travel of the object;
  determining an expected route of the object, wherein the expected route of the object is a pre-planned route for the object to take and includes an expected future position of the object at a future time;
  comparing the trajectory of the object to the expected route of the object;
  determining a confidence level associated with the expected route of the object based on a result of the comparing;
  updating the trajectory of the object based on the expected route of the object and the confidence level associated with the expected route of the object; and
  operating the vehicle based on the updated trajectory of the object.

17. The vehicle of claim 16, wherein determining the expected route of the object includes at least one of
  receiving route information from a server using the at least one transceiver, or
  receiving route information from a transceiver or a mobile device associated with the object.

18. The vehicle of claim 16, wherein comparing the trajectory of the object to the expected route of the object includes determining that the position of the object is an expected position along the expected route.

19. The method of claim 1, wherein determining the confidence level associated with the expected route of the object comprises:
  determining at least one of an accuracy or a reliability of the expected route of the object based on at least one of:
    a time when the expected route is updated, or
    a reputation of a data source where the expected route is obtained.

20. The method of claim 1, wherein updating the trajectory of the object based on the expected route of the object and the confidence level associated with the expected route of the object comprises one of:
  determining that the confidence level associated with the expected route of the object is greater than a predetermined threshold, and updating the trajectory of the object by increasing an emphasis associated with the expected route of the object, or
  determining that the confidence level associated with the expected route of the object is lower than a predetermined threshold, and updating the trajectory of the object by decreasing an emphasis associated with the expected route of the object.

* * * * *